W. H. ROBINSON.
VEHICLE TIRE.
APPLICATION FILED SEPT. 28, 1918.
1,340,984. Patented May 25, 1920.
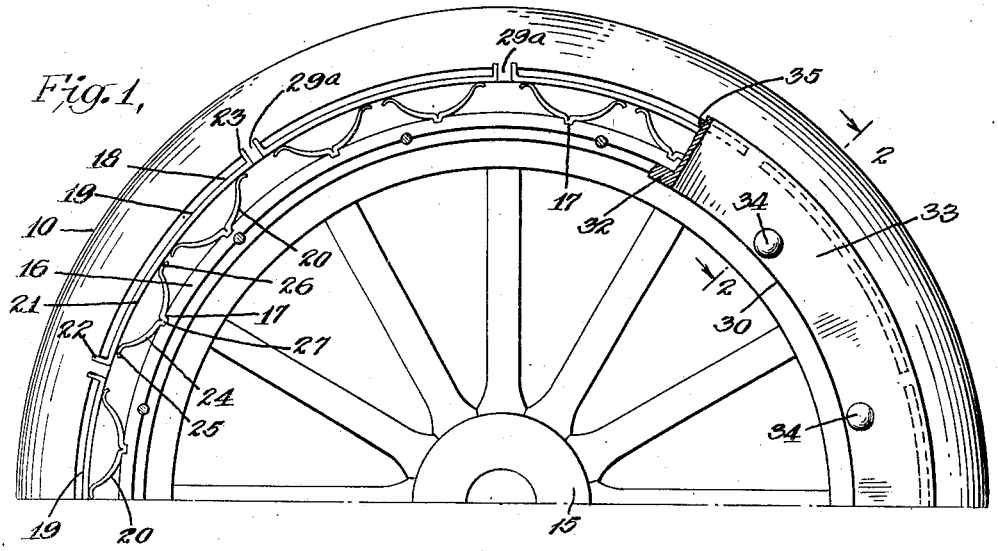
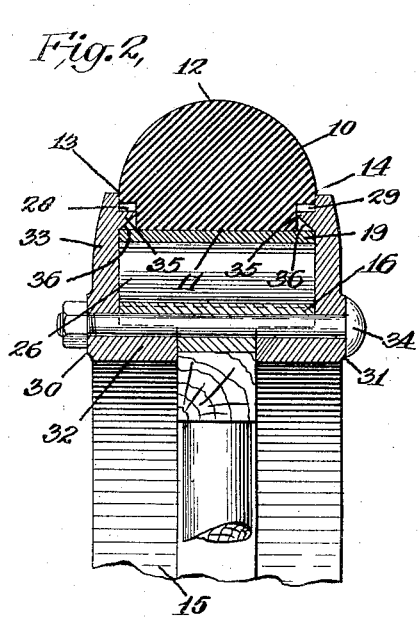
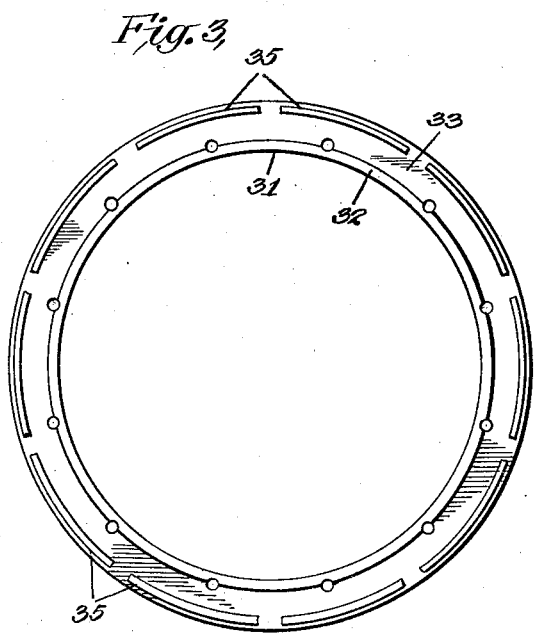
Inventor
William H. Robinson
By his Attorney
W. T. Criswell

UNITED STATES PATENT OFFICE.

WILLIAM H. ROBINSON, OF BROOKLYN, NEW YORK, ASSIGNOR OF ONE-HALF TO ERNEST KENDALL, OF BROOKLYN, NEW YORK.

VEHICLE-TIRE.

1,340,984.  Specification of Letters Patent.  Patented May 25, 1920.

Application filed September 23, 1918. Serial No. 256,083.

*To all whom it may concern:*

Be it known that I, WILLIAM H. ROBINSON, a citizen of the United States, and a resident of New York, borough of Brooklyn, in the county of Kings and State of New York, have invented a certain new and useful Improvement in Vehicle-Tires, of which the following is a full, clear, and exact specification.

This invention relates to a class of devices adapted to be used in conjunction with the wheels of vehicles.

My invention has for its object primarily to provide a simple, efficient and durable tire designed to be employed on the wheels of vehicles, such as automobiles and the like, so that the use of pneumatic tubes may be dispensed with, in order to overcome the liability of the occurrence of accidents as well as avoiding the annoyance resulting from punctures and blow-outs as is incident to the present methods of employing inflatable tires. The invention consists essentially in mounting on the felly of a vehicle wheel a tread or tire element, made of rubber or other resilient material, and this tread element is of a diameter greater than the diameter of the felly so as to be spaced from the outer periphery of the felly. Between the tread element and the felly of the wheel are a number of spaced removable springs for cushioning the element on the wheel, and at the sides of the resilient tread element are annular plates or band members adapted to be arranged in contact with the sides of the felly of the vehicle wheel.

Other objects of the invention are to provide retainers for releasably holding the annular plates and the tread element together whereby the element will be prevented from tending to slidably move circumferentially between the annular plates; and to provide means for detachably fastening the annular plates to the felly of the wheel.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a fragmentary view, partly broken away, showing a portion of a vehicle wheel with one form of tire embodying my invention applied thereto.

Fig. 2 is an enlarged fragmentary transverse sectional view, partly in detail, taken on the line 2—2 of Fig. 1, and Fig. 3 is an elevation of one of the annular L-shaped plates used in the device.

The device has an annular tread or tire element 10 made preferably of rubber which may be vulcanized by the usual methods to a suitable degree of resiliency, or the tread member may be free of all vulcanization. In cross-section the resilient tread element is substantially semi-circular in shape to provide a flat inner surface 11, a curved outer or bearing surface 12 and side faces 13 and 14. This tread element is adapted to be mounted on the wheel, as 15, of a vehicle, such as an automobile and the like, having a rim or felly 16 provided with transversely disposed grooves 17 in its outer periphery, and the diameter of the tread element is greater than the diameter of the outer periphery of the felly so that the inner surface 11 of the tread element will be spaced from the outer periphery of the felly when the tread element is applied to the wheel.

Between the flat inner surface 11 of the tread element 10 and the grooved periphery of the felly of the vehicle wheel is a cushion 18 which may be of any suitable type, though this cushion is preferably composed of two series of coöperating springs 19 and 20, each series including any desired number, and the springs of each series being preferably of corresponding formations. Each of the springs 19 has a body part 21 which is preferably in the form of a flat strip of a width corresponding to the extreme width of the tread element 10 as well as being curved to conform with the curvature of the flat inner surface 11 of the tread element, and the ends of each of the springs 19 are bent upwardly toward the convexity of the body part 21 to provide two flanges, as 22 and 23. A suitable number of the springs 19 are applied to the flat inner surface 11 of the resilient tread element 10 so that the end flanges of each spring are spaced from the end flanges of the next adjacent springs, and all of these springs are held to the tread element by the flanges being embedded in the tread element, as shown. The series of the springs 20 preferably include twice the number of the number of the springs 19. That is, coöperating with each of the springs 19 are two of the springs 20, though in instances a greater or less number of the springs 20 may be used as occasion requires and all of these springs are similarly formed. Each of the springs 20 is made of a strip of spring metal bent in substantially a semicircular shape to provide a curved body part 24, and the ends of each spring are slightly curved, as at 25 and 26, toward the convexity of the body part, while the central portion of the body part 24 of each spring is also bent to provide a lug 27 to protrude outwardly from the convexity of the body part. I prefer to employ two of the springs 20 for coöperation with each of the springs 19, and, as illustrated, each of the springs 20 is preferably tapered toward its curved ends 25 and 26. The springs 20 are applied to the vehicle wheel by the lugs 27 being removably seated in the transverse grooves 17 of the felly 16 of the wheel, these lugs and grooves being positioned to allow two of the springs 20 to coöperate with each of the springs 19, and by arranging the springs 20 in this manner the concavities of both series of the springs are in opposition, while the curved ends of the springs 20 movably bear on the springs 19. Moreover, by tapering the springs 20 they serve to compensate for the variations of the loads which may be imposed on the tire.

Parts of the edges of the flat inner surface 11 of the resilient tread element 10 are cut-out to provide spaced pairs of grooves 28 and 29, and the grooves of each pair are similar in lengths to the lengths of the springs 19 of the cushion 18. The parts of the flat inner surface 11 of the tread element by forming the grooves are considerably less in widths than the widths of the springs 19, and the flanges 22 and 23 of the springs being embedded in the tread element at the ends of the grooves the parts of the tread element between the grooves together with the flanges of the springs 19 provide on the sides of the tread element a number of stops 29ª.

Serving as means to detachably hold the tread element 10 and the springs 19 and 20 of the cushion 18 on the felly of the wheel a pair of annular plates or band members 30 and 31 are provided. The plates 30 and 31 are of widths to extend from the underside of the felly 16 of the vehicle wheel to parts of the tread element 10 which are slightly above the grooves 28 and 29 of the tread element, and these plates are of circumferences to encompass the sides of the felly of the wheel and the sides of the tread element. In cross section each of the annular plates 30 and 31 is approximately L-shaped to provide angularly disposed arms, as 32 and 33. These circular L-shaped plates are arranged one on each side of the felly and tread element so that the arms 32 of the plates are in contact with the underside of the felly and so that the arms 33 contact with the sides of the tread element in bridging arrangement over the grooves of the tread element. The L-shaped plates are then detachably fastened to the felly of the wheel by bolts, as 34, which are passed through spaced registered holes in the felly of the wheel as well as in the plates.

To prevent the resilient tread, or tire element 10 from tending to slip circumferentially between the L-shaped plates 30 and 31 when the vehicle is traveling, retainers 35 are provided. The retainers 35 are preferably in the forms of spaced flanges which protrude from the arm 33 of the L-shaped plate 30 into the grooves 28 of the tread element 10, and also spaced flanges which protrude from the arm 33 of the L-shaped plate 31 into the grooves 29 of the tread element. The flanges 35 of the L-shaped plates are of slightly less lengths than the lengths of the grooves 28 and 29 of the tread element, and the flanges are curved to removably fit snugly in the grooves as well as being of slightly less thicknesses than the widths of the grooves. The underside of each of the flanges 35 is beveled lengthwise, at 36, to allow the flat surface 11 of the tread 10 to resiliently expand when the tread is compressed and by employing these forms of retainers or flanges the tread element will be held against accidental movement circumferentially during the travel of the vehicle.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

In a vehicle tire, spaced flanges each with a beveled inner side protruding from opposed faces of two spaced plates provided on the felly of the wheel of the vehicle and said flanges being disposed in spaced grooves in a resilient tread element arranged between the plates.

This specification signed and witnessed this 26th day of September A. D. 1918.

WILLIAM H. ROBINSON.

Witnesses:
E. W. JONES,
L. CASANO.